(12) United States Patent
Makishima et al.

(10) Patent No.: US 12,700,419 B2
(45) Date of Patent: Aug. 4, 2026

(54) SOUND SOURCE SEPARATION METHOD, SOUND SOURCE SEPARATION APPARATUS, AND PROGRAM

(71) Applicant: NTT, Inc., Tokyo (JP)

(72) Inventors: Naoki Makishima, Tokyo (JP); Ryo Masumura, Tokyo (JP)

(73) Assignee: NTT, Inc., Tokyo (JP)

( * ) Notice: Subject to any disclaimer, the term of this patent is extended or adjusted under 35 U.S.C. 154(b) by 292 days.

(21) Appl. No.: 18/275,950

(22) PCT Filed: Feb. 8, 2021

(86) PCT No.: PCT/JP2021/004540
§ 371 (c)(1),
(2) Date: Aug. 4, 2023

(87) PCT Pub. No.: WO2022/168297
PCT Pub. Date: Aug. 11, 2022

(65) Prior Publication Data
US 2024/0135950 A1     Apr. 25, 2024
US 2024/0233744 A9     Jul. 11, 2024

(51) Int. Cl.
| | |
|---|---|
| *G10L 15/25* | (2013.01) |
| *G10L 15/06* | (2013.01) |
| *G10L 21/028* | (2013.01) |

(52) U.S. Cl.
CPC .......... *G10L 21/028* (2013.01); *G10L 15/063* (2013.01); *G10L 15/25* (2013.01)

(58) Field of Classification Search
CPC ..... G10L 21/028; G10L 15/063; G10L 15/25; G10L 25/30; G10L 21/0272
See application file for complete search history.

(56) References Cited

U.S. PATENT DOCUMENTS

| | | | |
|---|---|---|---|
| 2005/0195990 A1* | 9/2005 | Kondo | G10L 25/90 |
| | | | 381/98 |
| 2016/0180865 A1* | 6/2016 | Citerin | G06V 20/52 |
| | | | 382/103 |
| 2019/0206417 A1* | 7/2019 | Woodruff | G10L 21/028 |

(Continued)

FOREIGN PATENT DOCUMENTS

| | | | | |
|---|---|---|---|---|
| CN | 110246512 A | * | 9/2019 | G10L 25/30 |
| JP | 2020187346 A | | 11/2020 | |

OTHER PUBLICATIONS

Yu et al. (2017) "Permutation invariant training of deep models for speaker-independent multi-talker speech separation" ICASSP, Mar. 5, 2017, pp. 241-245.

(Continued)

*Primary Examiner* — Paras D Shah
*Assistant Examiner* — Mulugeta Tuji Dugda

(57) ABSTRACT

A mixed acoustic signal including sound emitted from a plurality of sound sources and sound source video signals representing at least one video of the plurality of sound sources are received as inputs, and at least a separated signal including a signal representing a target sound emitted from one sound source represented by the video is acquired. However, at least the separated signal is acquired using properties of the sound source that affects sound emitted by the sound source acquired from the video and/or features of a structure used for the sound source to emit the sound.

8 Claims, 3 Drawing Sheets

(56)     References Cited

U.S. PATENT DOCUMENTS

| | | | | |
|---|---|---|---|---|
| 2021/0174817 | A1* | 6/2021 | Grauman | ................ G10L 25/51 |
| 2022/0067386 | A1* | 3/2022 | Rotman | ................ G06F 18/217 |

OTHER PUBLICATIONS

Lu et al. (2019) "Audio-visual deep clustering for speech separation" IEEE/ACM Transactions on Audio, Speech, and Language Processing, vol. 27, No. 11, pp. 1697-1712.
Ephrat et al. (2018) "Looking to Listen at the Cocktail Party: A Speaker-Independent Audio-Visual Model for Speech Separation" ACM Trans. on Graphics, vol. 37, No. 4, pp. 112:1-112:11.

\* cited by examiner

SOUND SOURCE SEPARATION METHOD, SOUND SOURCE SEPARATION APPARATUS, AND PROGRAM

CROSS-REFERENCE TO RELATED APPLICATIONS

This application is a U.S. National Stage Application filed under 35 U.S.C. § 371 claiming priority to International Patent Application No. PCT/JP2021/004540, filed on 8 Feb. 2021, the disclosure of which is hereby incorporated herein by reference in its entirety.

TECHNICAL FIELD

The present invention relates to sound source separation technology, and more particularly, to multimodal sound source separation.

BACKGROUND ART

In single-channel sound source separation technology for inferring the speech signal from each of speakers before having been mixed from a mixed signal of the speech of a plurality of speakers measured by a single microphone, it is general to simultaneously infer all sound source signals included in the mixed signal using a neural network. An inferred sound source signal is called a separated signal. In this framework, since the output order of signals corresponding to respective speakers included in separated signals is arbitrary, processing at the subsequent stage such as speaker identification is required when the speech of a specific speaker is extracted. Further, at the time of learning model parameters of a neural network, it is necessary to calculate errors between a separated signal and a sound source signal before mixing for each speaker and to evaluate the entire errors therefrom. In this case, there is a problem that errors cannot be determined if a separated signal and a sound source signal are not associated with each speaker. This problem is called a permutation problem.

On the other hand, permutation invariant training (PIT) for calculating errors with respect to the association between all elements of a sound source signal and a separated signal corresponding to each speaker and optimizing model parameters of a network such that the overall error based on the errors is minimized has been proposed (refer to Non Patent Literature 1, for example). Further, multimodal speech separation has been proposed in which face videos of speakers are input simultaneously with mixed speech signals, and the output order of signals corresponding to the speakers included in separated signals is uniquely determined from the videos of the speakers (refer to Non Patent Literature 2 and 3, for example). In multi-modal sound source separation, it is confirmed that the performance is higher than that of speech separation using only sound in consideration of utterance timings and utterance content at the time of separation while solving the permutation problem, by using a video of each speaker.

CITATION LIST

Non Patent Literature

[NPL 1] D. Yu, M. Kolbak, Z. Tan, and J. Jensen, "Permutation invariant training of deep models for speaker-independent multitalker speech separation," in Proc. ICASSP, 2017, pp. 241-245.

[NPL 2] R. Lu, Z. Duan, and C. Zhang, "Audio-visual deep clustering for speech separation," IEEE/ACM Trans. ASLP, vol. 27, No. 11, pp. 1697-1712, 2019.

[NPL 3] A. Ephrat, I. Mosseri, O. Lang, T. Dekel, K. Wilson, A. Hassidim, W. T. Freeman, and M. Rubinstein, "Looking to listen at the cocktail party: a speaker-independent audio-visual model for speech separation," ACM Trans. Graph., vol. 37, No. 4, pp. 112: 1-112: 11, 2018.

SUMMARY OF INVENTION

Technical Problem

However, in conventional PIT and multimodal sound source separation, model parameters are trained in consideration of only a distance between a sound source signal and a separated signal in the sound domain. In such a learning method, features of a speaker (for example, features such as speaker characteristics and phoneme information) included in a separated signal cannot be directly considered. This leads to the speech of other speakers remaining and distortion of the speech in the separated signal, and thus separation accuracy is deteriorated.

Such a problem is not limited to cases where sound source separation of speech is performed, and is common to cases where sound source separation of arbitrary sound is performed.

In view of the aforementioned circumstances, an object of the present invention is to improve separation accuracy of sound source separation.

Solution to Problem

A mixed acoustic signal including sound emitted from a plurality of sound sources and sound source video signals representing at least one video of the plurality of sound sources are received as inputs, and at least a separated signal including a signal representing a target sound emitted from one sound source represented by the video is acquired. However, at least the separated signal is acquired using properties of the sound source that affects sound emitted by the sound source acquired from the video and/or features of a structure used for the sound source to emit the sound.

Advantageous Effects of Invention

Accordingly, features of a sound source included in a separated signal appearing in features of a sound source video signal are considered in sound source separation, and thus the separation accuracy of sound source separation can be improved.

DESCRIPTION OF EMBODIMENTS

Figure 1:
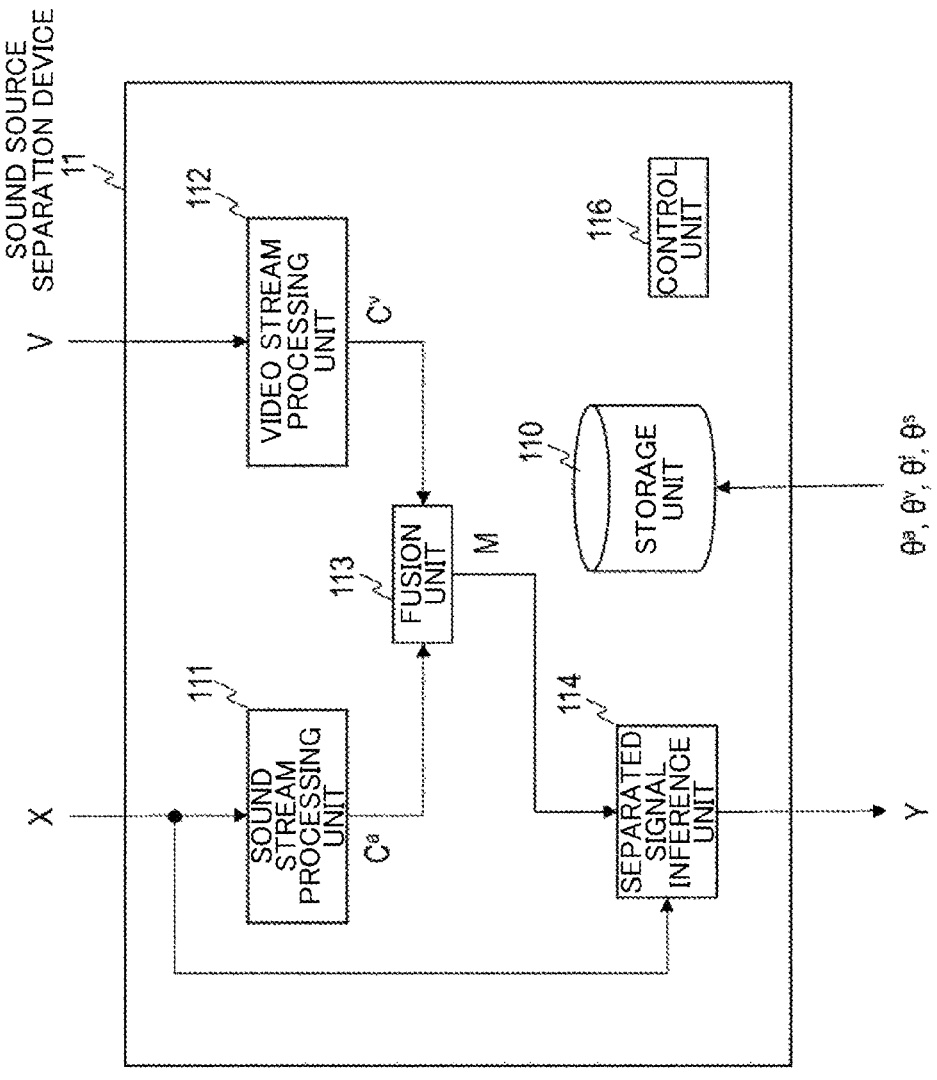
FIG. 1 is a block diagram illustrating a functional configuration of a sound source separation device of an embodiment.

An embodiment of the present invention will be described below with reference to the drawings.

First Embodiment

In the present embodiment, a function for performing multimodal sound source separation in consideration of features of a separated signal is introduced. Accordingly, distortion and residual disturbance sound included in a separated signal are reduced, and thus the separation accuracy of sound source separation can be improved. A point of the present embodiment is that a model for inferring at least a separated signal on the basis of differences between features of the separated signal and features of teaching sound source video signals that are teaching data of sound source video signals representing videos of sound sources is trained. The videos of the sound sources include elements closely related to features of sound emitted from the respective sound sources. For example, when a sound source is a speaker, a video of the speaker (for example, a video including a face video of the speaker) includes elements such as an utterance timing, phoneme information inferred from the mouth, and speaker information such as sex and age, which have a close relation with features of a sound source signal. Further, a video of a sound source is not affected by surrounding sound (for example, noise), and these elements are not deteriorated even under high noise. Therefore, in the present embodiment, features of a separated signal are associated with features of teaching sound source video signals, a model for inferring the separated signal is trained on the basis of differences between the features, and sound source separation is performed using the model. In other words, speaker information obtained from an image signal, the movement of the throat used for vocalization, and a likelihood of a speech signal being generated from the mouth are inferred and used for sound source separation. It is also possible to rephrase a speech signal generation process as acquiring a speech signal from an image signal to perform sound source separation.

That is, in the present embodiment, a mixed acoustic signal representing a mixed sound of sound emitted from a plurality of sound sources and sound source video signals representing a video of at least some of the plurality of sound sources are applied to a model, and a separated signal including a signal representing a target sound emitted from a certain sound source among the plurality of sound sources is inferred. However, the model is obtained by learning based on differences between at least features of a separated signal obtained by applying a teaching mixed acoustic signal which is teaching data of the mixed acoustic signal and teaching sound source video signals which are teaching data of sound source video signals to the model, and features of the teaching sound source video signals. In this manner, by explicitly taking the relationship between the features of the separated signal and the features of videos of sound sources into model training for sound source separation, sound source separation can be performed in consideration of elements such as phoneme information inferred from utterance timing and the mouth, and speaker information such as sex and age. Accordingly, it is possible to take features which have not been handled in multimodal sound source separation into account, for example, to reduce distortion and residual disturbance sound in a separated signal and to improve the separation accuracy of sound source separation.

Hereinafter, the present embodiment will be described in detail. In the present embodiment, a case where a model is a neural network, a sound source is a speaker, and sound is a speech will be exemplified. However, the present invention is not limited thereto.

Configuration

Figure 2:
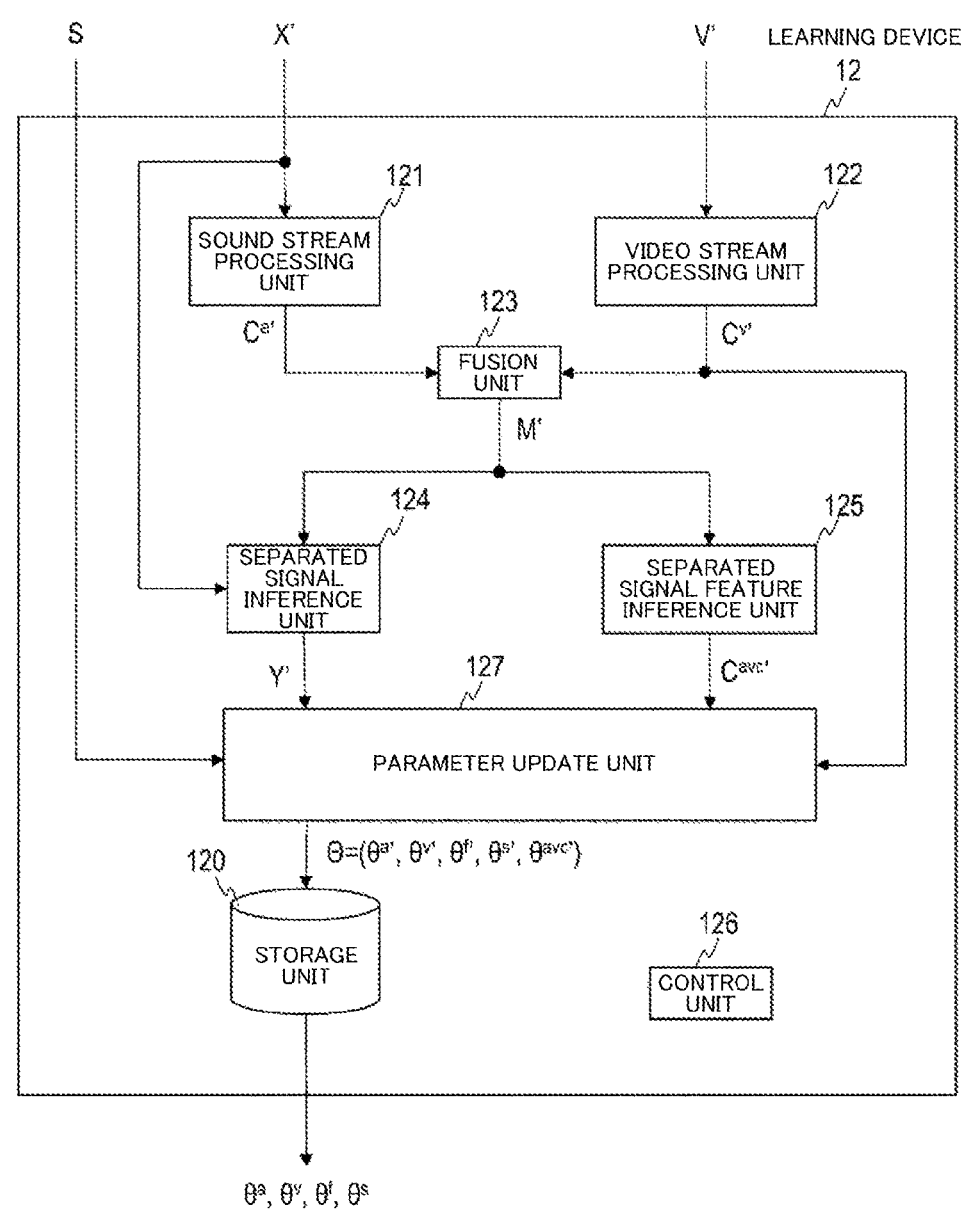
FIG. 2 is a block diagram illustrating a functional configuration of a learning device of an embodiment.

As illustrated in FIG. 1, a sound source separation device 11 of the present embodiment includes a storage unit 110, a sound stream processing unit 111, a video stream processing unit 112, a fusion unit 113, a separated signal inference unit 114, and a control unit 116, and executes each type of processing which will be described later on the basis of control of the control unit 116. Although detailed description will be omitted, data obtained in sound source separation processing is stored in the storage unit 110, read and used as necessary. As illustrated in FIG. 2, a learning device 12 includes a storage unit 120, a sound stream processing unit 121, a video stream processing unit 122, a fusion unit 123, a separated signal inference unit 124, a separated signal feature inference unit 125, a control unit 126, and a parameter update unit 127, and executes each type of processing which will be described later on the basis of control of the control unit 126. Although detailed description will be omitted, data obtained in learning processing is stored in the storage unit 120, read and used as necessary.

<Sound Source Separation Processing (Multimodal Sound Source Separation Processing)>

Sound source separation processing of the present embodiment will be described with reference to FIG. 1.

Input: Mixed acoustic signal $X=\{x_1, \ldots, x_T\}$

Sound source video signal $V=\{V_1, \ldots, V_N\}$

Model parameters $\theta^a$, $\theta^v$, $\theta^f$, and $\theta^s$

Output: Separated signal $Y=\{Y_1, \ldots, Y_n\}$

The sound source separation device 11 of the present embodiment receives a mixed acoustic signal $X=\{x_1, \ldots, x_T\}$ which is an acoustic signal representing a mixed sound of sound emitted from a plurality of sound sources (an acoustic signal obtained by mixing signals corresponding to the sound emitted from the plurality of sound sources), sound source video signals $V=\{V_1, \ldots, V_N\}$ representing videos of at least some of the plurality of sound sources, and model parameters (a sound stream model parameter $\theta^a$, a video stream model parameter $\theta^v$, a fusion model parameter $\theta^f$, and a separated signal inference model parameter $\theta^s$) as inputs, applies the mixed acoustic signal X and the sound source video signals V to a neural network (model) determined on the basis of the model parameters $\theta^a$, $\theta^v$, $\theta^f$, and $\theta^s$, infers a separated signal $Y=\{Y_1, \ldots, Y_N\}$ including a signal representing a target sound emitted from a certain sound source among the plurality of sound sources, and outputs it. The neural network is obtained by learning based on differences between at least features Y of the separated signal obtained by applying a teaching mixed acoustic signal X' which is teaching data of the mixed acoustic signal X and teaching sound source video signals V' which are teaching data of the sound source video signals V to the neural network, and features of teaching sound source video signals which are teaching data of an acoustic signal S. (That is, the neural network is determined on the basis of the model parameters $\theta^a$, $\theta^V$, $\theta^f$, and $\theta^s$ obtained by the learning.) Details of this learning processing will be described later.

The plurality of sound sources include sound sources exhibiting appearances correlated with sound emitted therefrom. Examples of sound sources exhibiting appearances correlated with sound emitted therefrom include speakers, animals, plants, natural objects, natural phenomena, machines, and the like. As an example, the present embodiment illustrates a case in which the plurality of sound sources include a plurality of different speakers. All of the plurality of sound sources may be speakers, or only some thereof may be speakers. When the sound sources are speakers, sound emitted from the speakers are speeches, the mixed acoustic signal X includes speech signals representing the speeches, and the sound source video signals V represents videos of the speakers.

The mixed acoustic signal X may be, for example, a time waveform signal (i.e., a time domain signal) obtained by digitally transforming an acoustic signal obtained by observing a mixed sound by an acoustic sensor such as a microphone, or may be a time-frequency domain signal obtained by transforming the time waveform signal into a frequency domain for each predetermined time interval (for example, an interval determined by a window function by which the time waveform signal is multiplied). Examples of the time-frequency domain signal include an amplitude spectrogram, a logarithmic mel filter bank output, and the like obtained by transforming a time waveform by short-time Fourier transform. Since the amplitude spectrogram and the logarithmic mel filter bank are well known, description thereof will be omitted. In the present embodiment, the mixed acoustic signal X is expressed as $X=\{x_1, \ldots, x_T\}$. Here, T is a positive integer representing a time frame length, $x_t$ is an element of the mixed acoustic signal X of a t-th frame, and $t=1, \ldots, T$ is a positive integer representing a frame index. That is, the mixed acoustic signal X is a time-series discrete acoustic signal.

The sound source video signals V are video signals obtained by photographing sound sources by a video sensor such as a web camera or a camera of a smartphone. For example, the sound source video signals V represent a video of each of the plurality of sound sources. The sound source video signals V may represent all the videos of the plurality of sound sources described above, or may represent only videos of some of the sound sources. For example, the sound source video signals V may represent videos of one or a plurality of sound sources emitting a target sound among the plurality of sound sources, or videos of sound sources emitting the target sound and other sound sources. For example, when sound sources are speakers, the sound source video signals V may represent videos of one or a plurality of speakers emitting the target sound among the plurality of speakers, or may represent videos of speakers emitting the target sound and other speakers. The sound source video signals V represent videos of sound sources exhibiting appearances correlated with sound emitted therefrom. For example, when the sound sources are speakers, the sound source video signals V represent videos including face videos of the speakers. In the present embodiment, the sound source video signal V is represented as $V=\{V_1, \ldots, V_N\}$. Here, $V_N=\{V_{n1}, \ldots, V_{nF}\}$ represents a video signal of an n-th sound source (for example, a speaker), and $V_{nf}$ represents a video signal of an f-th frame of the n-th sound source. $n=1, \ldots, N$ is a positive integer representing a sound source index, N is an integer of 1 or more representing the number of sound sources (for example, practical sound source separation processing is performed when N is an integer of 2 or more), $f=1, \ldots, F$ is a positive integer representing a video frame index, and F is a positive integer representing the number of video frames. Although the number of channels, the number of pixels, and fps of $v_{nf}$ are arbitrary, for example, a video that is a grayscale image having the number of channels of 1, in which the resolution of the entire face of 224 pixels×224 pixels and 25 fps is assumed as $V_{nf}$. In this example, the grayscale is used in order to reduce the resources used for calculation, but there is no problem at all in the case of an RGB image.

In the present embodiment, the acoustic signal representing sound emitted from the plurality of sound sources before mixing is represented as $S=\{S_1, \ldots, S_N\}$. Here, $S_n=\{s_{n1}, \ldots, s_{nT}\}$ represents the acoustic signal of sound emitted from the n-th sound source, and $s_{nt}$ represents the acoustic signal of the t-th frame of the sound emitted from the n-th sound source. The separated signal Y is an inferred signal of the acoustic signal S. In the present embodiment, the separated signal Y is represented as $Y=\{Y_1, \ldots, Y_N\}$. Here, $Y_n=\{y_{n1}, \ldots, y_{nT}\}$ is an inferred signal of the acoustic signal $S_n=\{s_{n1}, \ldots, s_{nT}\}$ of the sound emitted from the n-th sound source, and $Y_{nt}$ is an inferred signal of the acoustic signal $s_{nt}$ of the t-th frame of the sound emitted from the n-th sound source. Any or all of $Y_1, \ldots, Y_N$ corresponds to the aforementioned "signal representing the target sound (signal representing the target sound emitted from a certain sound source among a plurality of sound sources)." Which of $Y_1, \ldots, Y_N$ is a signal representing the target sound depends on the use of the separated signal. The acoustic signal S and the separated signal Y may be time waveform signals (i.e., time domain signals) or time-frequency domain signals such as an amplitude spectrogram or a logarithmic mel filter bank output.

<<Overall Flow of Sound Source Separation Processing>>

As illustrated in FIG. 1, the storage unit 110 stores the model parameters $\theta^a$, $\theta^v$, $\theta^f$, and $\theta^s$ obtained by learning processing which will be described later. The sound stream model parameter $\theta^a$ is input to the sound stream processing unit 111, the video stream model parameter $\theta^v$ is input to the video stream processing unit 112, the fusion model parameter $\theta^f$ is input to the fusion unit 113, and the separated signal inference model parameter $\theta^s$ is input to the separated signal inference unit 114. The sound stream processing unit 111 obtains an embedding vector $C^a$ of the mixed acoustic signal from the input mixed acoustic signal X on the basis of the sound stream model parameter $\theta^a$ and outputs it. The video stream processing unit 112 obtains an embedding vector $C^v$ of the sound source video signals from the input sound source video signals V on the basis of the video stream model parameter $\theta^v$ and outputs it. The fusion unit 113 obtains an embedding vector M of the sound source signal from an embedding vector $C^a$ of the input mixed acoustic signal and the embedding vector $C^v$ of the sound source video signals on the basis of the fusion model parameter $\theta^f$ and outputs it. The separated signal inference unit 114 obtains a separated signal Y from the embedding vector M of the input sound source signal and the mixed acoustic signal X on the basis of the separated signal inference model parameter $\theta^s$ and outputs it. This will be described in detail below.

<<Processing of Sound Stream Processing Unit 111 (Step S111)>>

Input: Mixed acoustic signal $X=\{x_1, \ldots, x_T\}$
  Sound stream model parameter $\theta^a$
Output: Embedding vector $C^a$ of mixed acoustic signal The mixed acoustic signal X and the sound stream model parameter $\theta^a$ are input to the sound stream processing unit 111. The sound stream model parameter $\theta^a$ may be input and set to the sound stream processing unit 111 in advance, or may be input each time the mixed acoustic signal X is input. The sound stream processing unit 111 infers and outputs the embedding vector $C^a$ of the mixed sound signal from the mixed sound signal X and the sound stream model parameter $\theta^a$. The embedding vector $C^a$ represents a feature of the mixed acoustic signal X and is expressed as a series of vectors having an arbitrary number $k^a$ of dimensions of one or more dimensions manually determined and taking continuous values or discrete values, for example. The number $k^a$ of dimensions is, for example, 1792 or the like. The series length of the embedding vector $C^a$ is T which is the same as that of the mixed acoustic signal X. That is, the embedding vector $C^a$ is expressed as a matrix of, for example, $T{\times}k^a$ or $k^a{\times}T$. The sound stream processing unit 111 infers the embedding vector $C^a$ according to, for example, the following formula (1).

[Math. 1]

$$C^a = AudioBlock(X; \theta^a) \tag{1}$$

Here, AudioBlock( ) is a function for obtaining and outputting the embedding vector $C^a$ of the mixed acoustic signal using the input mixed acoustic signal X and the sound stream model parameter $\theta^a$. As this function, any neural network can be used as long as a learning method which will be described later can be applied thereto, and for example, a feedforward neural network or a recurrent neural network can be used. How to obtain the sound stream model parameter $\theta^a$ will be described with reference to learning processing which will be described later.

<<Processing of Video Stream Processing Unit 112 (Step S112)>>

Input: Sound source video signal $V=\{V_1, \ldots, V_N\}$

Video stream model parameter $\theta^v$

Output: Embedding vector $C^v=\{C^v_1, \ldots, C^v_N\}$ of sound source video signal The sound source video signals V and the video stream model parameter $\theta^V$ are input to the video stream processing unit 112. The video stream model parameter $\theta^V$ may be input and set to the video stream processing unit 112 in advance, or may be input each time the sound source video signal V is input. The video stream processing unit 112 infers the embedding vector $C^v=\{C^v_1, \ldots, C^v_N\}$ of the sound source video signal from the sound source video signal V and the video stream model parameter $\theta^v$ and outputs it. This embedding vector $C^V$ represents a feature of the sound source video signal V, and $C^v_n$ (n=1, . . . , N) represents a feature of the video of the n-th sound source (speaker in the present embodiment). For example, $C^v_n$ has an arbitrary number $k^V_n$ of dimensions of one or more dimensions manually determined and takes continuous values or discrete values. $k^V_1, \ldots, k^V_N$ may be identical, or at least some thereof may different from the others. The $k^V_n$ of dimensions is, for example, 1792 or the like. The series length of the $C^V_n$ is T which is the same as that of the mixed acoustic signal. That is, $C^V_n$ is expressed as a matrix of, for example, $T{\times}k^V_n$ or $k^V_n{\times}T$. Although the subscript "γ" in the case of "$\alpha^\beta_\gamma$" should be originally located immediately below the subscript "β," the subscript "γ" may be written obliquely to the right below the subscript "β" due to the restriction of description in the present description. The video stream processing unit 112 infers the embedding vector $C^V$ according to, for example, the following formula (2).

[Math. 2]

$$C^V = VideoBlock(V; \theta^V) \tag{2}$$

The VideoBlock( ) is a function for obtaining and outputting the embedding vector $C^V$ of the sound source video signal using the input sound source video signal V and the video stream model parameter $\theta^v$. As this function, any neural network can be used as long as the learning method which will be described later can be applied thereto, and for example, a three-dimensional CNN or a recurrent neural network can be used. How to obtain the video stream model parameter $\theta^v$ will be described with reference to learning processing which will be described later.

<<Processing of Fusion Unit 113 (Step S113)>>

Input: Embedding vector $C^a$ of mixed acoustic signal

Embedding vector $C^V$ of sound source video signal

Fusion model parameter $\theta^f$

Output: Embedding vector $M=\{M_1, \ldots, M_N\}$ of sound source signal

The embedding vector $C^a$ of the mixed acoustic signal, the embedding vector $C^V$ of the sound source video signal, and the fusion model parameter $\theta^f$ are inputted to the fusion unit 113. The fusion model parameter $\theta^f$ may be input and set to the fusion unit 113 in advance, or may be input each time the embedding vector $C^a$ of the mixed acoustic signal and the embedding vector $C^V$ of the sound source video signal are input. The fusion unit 113 infers the embedding vector $M=\{M_1, \ldots, M_N\}$ of sound source signal from the embedding vector $C^a$ of the mixed acoustic signal, the embedding vector $C^V$ of the sound source video signal, and the fusion model parameter $\theta^f$ and outputs it. The embedding vector M represents features of the embedding vector $C^a$ of the mixed acoustic signal and the embedding vector $C^V$ of the sound source video signal. Here, $M_n$ (n=1, . . . , N) represents an element corresponding to the n-th sound source (speaker in the present embodiment) of the embedded vector M of the sound source signal. For example, M n has an arbitrary number $k^m_n$ of dimensions of one or more dimensions manually determined and takes continuous values or discrete values. $K^m_1, \ldots, K^m_N$ may be identical, or at least some thereof may be different from the others. The number $k^m_n$ of dimensions is, for example, 1792 or the like. The series length of $M_n$ is T which is the same as that of the mixed acoustic signal. That is, M n is expressed as a matrix of, for example, $T{\times}k^m_n$ or $k^m_n{\times}T$. The fusion unit 113 infers the embedding vector M of the sound source signal, for example, according to the following formula (3).

[Math. 3]

$$M = FusionBlock(C^a, C^V; \theta^f) \tag{3}$$

Here, FusionBlock( ) is a function for obtaining and outputting the embedded vector M of the sound source signal from the embedding vector $C^a$ of the input mixed acoustic signal, the embedding vector $C^V$ of the sound source video signal, and the fusion model parameter $\theta^f$. As this function, any neural network can be used as long as the learning method which will be described later can be applied thereto, and for example, a feedforward neural network can be used. How to obtain the fusion model parameter $\theta^f$ will be described with reference to learning processing which will be described later.

<<Processing of Separated Signal Inference Unit 114 (Step S114)>>

Input: Embedding vector $M=\{M_1, \ldots, M_N\}$ of sound source signal

Mixed acoustic signal $X=\{x_1, \ldots, x_T\}$

Separated signal inference model parameter $\theta^s$

Output: Separated signal $Y=\{Y_1, \ldots, Y_N\}$

The embedding vector M of the sound source signal, the mixed acoustic signal X, and the separated signal inference model parameter $\theta^s$ are inputted to the separated signal inference unit 114. The separated signal inference model parameter $\theta^s$ may be input and set to the separated signal inference unit 114 in advance, or may be input each time the embedding vector M of the sound source signal and the mixed acoustic signal X are input. The separated signal inference unit 114 infers a separated signal Y={Y₁, ..., Yₙ} from the embedding vector M of the sound source signal, the mixed acoustic signal X, and the separated signal inference model parameter $\theta^s$ and outputs it. The separated signal inference unit 114 infers this separated signal Y, for example, according to the following formula (4).

[Math. 4]

$$C^a = \text{Separation}(M, X; \theta^s) \qquad (4)$$

Here, Separation( ) is a function for inferring the separated signal Y from the embedding vector M of the input sound source signal and the mixed acoustic signal X and outputting it. As this function, any neural network can be used as long as the learning method which will be described later can be applied thereto, and for example, a sigmoid function or the like can be used.

<Learning Processing (Multimodal Learning Processing)>

Learning processing of the present embodiment will be described using FIG. 2.

Input: Teaching mixed acoustic signals X'={x₁', ..., x_T'}

Teaching sound source video signal V'={V₁', ..., V_N'}

Teaching sound source signal S={S₁, ..., S_N}

Output: Sound stream model parameter $\theta^a$, video stream model parameter $\theta^v$, fusion model parameter $\theta^f$, separated signal inference model parameter $\theta^s$, and separates signal feature inference model parameter $\theta^{avc}$ The learning device 12 of the present embodiment at least obtains model parameters $\theta^a$, $\theta^v$, $\theta^f$, $\theta^s$, and $\theta^{avc}$ by learning based on differences between features of a separate signal V={Y₁', ..., Y_N'} obtained by applying a teach mixed acoustic signal X'={x₁', ..., x_T'} which is teaching data of a mixed acoustic signal X and a teaching sound source video signal V'={V₁', ..., V_N'} which is teaching data of a sound source video signal V to a neural network (model), and features of the teaching sound source video signal V'={V₁', ..., V_N'} and outputs them. For example, the learning device 12 at least performs learning such that similarity between an element representing a feature of a teaching sound source video signal S_n corresponding to a first sound source among a plurality of sound sources and an element representing a feature of a separation signal Y_n' corresponding to a second sound source different from the first sound source decreases, and similarity between the element representing the feature of the teaching sound source video signal S n corresponding to the first sound source and an element representing a feature of a separated signal Y_n corresponding to the first sound source increases. The present embodiment shows an example in which the model parameters $\theta^a$, $\theta^v$, $\theta^f$, $\theta^s$, and $\theta^{avc}$ are obtained by learning based on differences between the separated signal Y' obtained by applying the teaching mixed audio signal X' and the teaching sound source video signal V' to a neural network (model), and teaching sound source signals S which are teaching data of separated signals corresponding to the teaching mixed audio signal X' and the teaching sound source video signal V' and output, in addition to the feature of the separated signal Y' and the feature of the teaching sound source video signal V'. However, the present invention is not limited thereto.

The teaching mixed acoustic signal X'={x₁', ..., x_T'} is teaching data of the mixed acoustic signal X={x₁, ..., x_T}, and the data format of the teaching mixed acoustic signal X'={x₁', ..., x_T'} is the same as the data format of the mixed acoustic signal X={x₁, ..., x_T}. There are a plurality of teaching mixed acoustic signals X', and the plurality of teaching mixed acoustic signals X' may include or may not include the mixed acoustic signal X to be an input of sound source separation processing.

The teaching sound source video signal V'={V₁', ..., V_N'} is teaching data of the sound source video signal V={V₁, ..., V_N}, and the data format of the teaching sound source video signal V'={V₁' ..., V_N'} is the same as that of the above-mentioned sound source video signal V={V₁, ..., V_N}. There are a plurality of teaching sound source video signals V', and the plurality of teaching sound source video signals V' may include or may not include the sound source video signal V to be an input of sound source separation processing.

The teaching sound source signals S={S₁, ..., S_N} are acoustic signals representing sound before mixing emitted from a plurality of sound sources corresponding to the teaching mixed sound signals X'={x₁', ..., x_T'} and the teaching sound source video signals V'={V'₁, ..., V'_N}. There are a plurality of teaching sound source signals S={S₁, ..., S_N} corresponding to the teaching mixed acoustic signals X'={x₁', ..., x_T'} and the teaching sound source video signals V'={V₁', ..., V_N'}. In learning processing, the following processing is performed on sets of the teaching mixed acoustic signals X', the teaching sound source video signals V', and the teaching sound source signals S corresponding to each other.

<Overall Flow of Learning Processing>

As illustrated in FIG. 2, the teaching mixed acoustic signals X'={x₁', ..., x_T'}, the teaching sound source video signals V'={V₁', ..., V_N'}, and the teaching sound source signals S={S₁ ..., S_N} corresponding to each other are input to the learning device 12. The teaching mixed acoustic signals X' are input to the sound stream processing unit 121 and the separated signal inference unit 124, the teaching sound source video signals V' are input to the video stream processing unit 122, and the teaching sound source signals S are input to the parameter update unit 127. The sound stream processing unit 121 obtains an embedding vector $C^{a'}$ of a mixed acoustic signal from the input teaching mixed acoustic signals X' on the basis of a provisional model parameter $\theta^{a'}$ of the sound stream model parameter $\theta^a$ and outputs it. The video stream processing unit 122 obtains an embedding vector $C^{a'}$ of a sound source video signal from the input teaching sound source video signals V' on the basis of a provisional model parameter $\theta^{v'}$ of the video stream model parameter $\theta^v$ and outputs it. The fusion unit 123 obtains an embedding vector M' of a sound source signal from the embedding vector $C^{a'}$ of the input mixed acoustic signal and the embedding vector $C^{v'}$ of the sound source video signal on the basis of a provisional model parameter $\theta^f$ of the fusion model parameter $\theta^f$ and outputs it. The separated signal inference unit 124 obtains a separated signal Y' from the embedding vector M' of the input sound source signal and the teaching mixed acoustic signals X' on the basis of a separated signal inference model parameter $\theta^{s'}$ and outputs it. The separated signal feature inference unit 125 obtains an embedding vector $C^{avc}$ of a separated signal from the embedded vector M' of the input sound source signal on the basis of a provisional separated signal feature inference model parameter $\theta^{avc}$ and outputs it. The parameter update unit 127 updates the provisional model parameters $\theta^{a'}$, $\theta^{v'}$, $\theta^{f'}$, $\theta^{s'}$, and $\theta^{avc'}$ by performing self-supervised learning based on errors between the teaching sound source signals S and the separated signal Y' and inter-modal correspondence errors between the embedding vector $C^{v'}$ of the sound source video signal and the embedding vector $C^{avc}$ of the separated signal. The provisional model parameters $\theta^{a'}$, $\theta^{v'}$, $\theta^{f'}$, $\theta^{s'}$, and $\theta^{avc'}$ which satisfy predetermined end conditions by repeating the above-described processing become the model parameters $\theta^{a}$, $\theta^{v}$, $\theta^{f}$, $\theta^{s}$, and $\theta^{avc}$. This will be described in detail below.

<<Initial Setting Processing of Parameter Update Unit 127 (Step S1271)>>

The parameter update unit 127 stores initial values of the provisional model parameters $\theta^{a'}$, $\theta^{v'}$, $\theta^{f'}$, $\theta^{s'}$, and $\theta^{avc'}$ of the model parameters $\theta^{a}$, $\theta^{v}$, $\theta^{f}$, $\theta^{s}$, and $\theta^{avc}$ in the storage unit 120. The initial values of the provisional model parameters $\theta^{a'}$, $\theta^{v'}$, $\theta^{f'}$, $\theta^{s'}$, and $\theta^{avc'}$ may be any values.

<<Processing of Sound Stream Processing Unit 121 (Step S121)>>

Input: Teaching mixed acoustic signals $X'=\{x_1', \ldots, x_T'\}$
Provisional sound stream model parameter $\theta^{a'}$ Output: Embedding vector $C^{a'}$ of mixed acoustic signal The input teaching mixed acoustic signals X' and the provisional sound stream model parameter $\theta^{a'}$ read from the storage unit 120 are input to the sound stream processing unit 121. The sound stream processing unit 121 infers the embedding vector $C^{a'}$ of the mixed sound signal from the teaching mixed sound signals X' and the provisional sound stream model parameter $\theta^{a'}$ and outputs it. This inference processing is the same as processing (step S111) (formula (1)) of the above-described sound stream processing unit 111 except that X, $\theta^{a}$, and $C^{a}$ are replaced by X', $\theta^{a'}$, and $C^{a'}$.

<<Processing of Video Stream Processing Unit 122 (Step S122)>>

Input: Teaching sound source video signal $V'=\{V_1', \ldots, V_N'\}$
Provisional video stream model parameter $\theta^{v'}$ Output: Embedding vector $C^{V'}=\{C_1^{V'}, \ldots, C_N^{V'}\}$ of sound source video signal The input teaching sound source video signals V' and the provisional video stream model parameter $\theta^{v'}$ read from the storage unit 120 are input to the video stream processing unit 122. The video stream processing unit 122 infers the embedding vector $C^{V'}=\{C_1^{V'}, C_N^{V'}\}$ of the sound source video signal from the teaching sound source video signals V' and the provisional video stream model parameter $\theta^{v'}$ and outputs it. This inference processing is the same as processing (step S112) (formula (2)) of the above-described video stream processing unit 112 except that V, $\theta^{v}$, and $C^{V}$ are replaced by V', $\theta^{v'}$, and $C^{V'}$.

<<Processing of Fusion Unit 123 (Step S123)>>

Input: Embedding vector $C^{a'}$ of mixed acoustic signal
Embedding vector $C^{V'}$ of sound source video signal
Provisional fusion model parameter $\theta^{f'}$ Output: Embedding vector $M'=\{M_1', \ldots, M_N'\}$ of sound source signal The embedding vector $C^{a'}$ of the mixed acoustic signal, the embedding vector $C^{V'}$ of the sound source video signal, and the provisional fusion model parameter $\theta^{f'}$ read from the storage unit 120 are input to the fusion unit 123. The fusion unit 123 infers an embedding vector $M'=\{M_1', \ldots, M_N'\}$ of a sound source signal from the embedding vector $C^{a'}$ of the mixed acoustic signal, the embedding vector $C^{V'}$ of the sound source video signal, and the provisional fusion model parameter $\theta^{f'}$ and outputs it. The data format of the embedding vector M' of the sound source signal is the same as the data format of the embedding vector M of the sound source signal. Further, this inference processing is the same as processing (step S113) (formula (3)) of the above-described fusion unit 113 except that $C^{a}$, $C^{V}$, $\theta^{f}$, and $M=\{M_1, \ldots, M_N\}$ are replaced by $C^{a'}$, $C^{V'}$, $\theta^{f'}$, and $M'=\{M_1', \ldots, M_N'\}$.

<<Processing of Separated Signal Inference Unit 124 (Step S124)>>

Input: Embedding vector $M'=\{M_1', \ldots, M_N'\}$ of sound source signal
Teaching mixed acoustic signals $X'=\{x_1', \ldots, x_T'\}$
Provisional separated signal inference model parameter $\theta^{s'}$ Output: Separated signals $Y'=\{Y_1', \ldots, Y_N'\}$ The embedding vector M' of the sound source signal, the teaching mixed acoustic signals X', and the provisional separated signal inference model parameter $\theta^{s'}$ read from the storage unit 120 are input to the separated signal inference unit 124. The separated signal inference unit 114 infers a separated signal $Y'=\{Y_1', \ldots, Y_N'\}$ from the embedding vector M' of the sound source signal, the teaching mixed acoustic signals X', and the provisional separated signal inference model parameter $\theta^{s'}$ and outputs it. The data format of the separated signal $Y'=\{Y_1', \ldots, Y_N'\}$ is the same as the data format of the above-described separated signal $Y=\{Y_1, \ldots, Y_N\}$. This inference processing is the same as processing (step S114) (formula (4)) of the above-described separated signal inference unit 114 except that $M=\{M_1, \ldots, M_N\}$, $X=\{x_1, \ldots, x_T\}$, $\theta^{s}$, and $Y=\{Y_1, \ldots, Y_N\}$ are replaced by $M'=\{M_1', \ldots, M_N'\}$, $X'=\{x_1', \ldots, x_T'\}$, $\theta^{s'}$, and $Y'=\{Y_1', \ldots, Y_N'\}$.

<<Processing of Separated Signal Feature Inference Unit 125 (Step S125)>>

Input: Embedding vector $M'=\{M_1', \ldots, M_N'\}$ of sound source signal
Provisional separated signal feature inference model parameter $\theta^{avc'}$ Output: Embedding vector $C^{avc'}=\{C_1^{avc'}, \ldots, C_N^{avc'}\}$ of separated signal The embedding vector M' of the sound source signal and the provisional separated signal feature inference model parameter $\theta^{avc'}$ read from the storage unit 120 are input to the separated signal feature inference unit 125. The separated signal feature inference unit 125 infers an embedding vector $C^{avc'}=\{C_1^{avc'}, \ldots, C_N^{avc'}\}$ of a separated signal from the embedding vector M' of the sound source signal and the provisional separated signal feature inference model parameter θavc' and outputs it. Here, the embedding vector $C^{avc'}$ represents a feature of a separated signal Y', and $C_n^{avc'}$ (where $n=1, \ldots, N$) represents a feature of an n-th separated signal $Y_n'$. For example, $C_n^{avc'}$ has an arbitrary number $k_n^{avc}$ of dimensions of one or more dimensions manually determined and takes continuous values or discrete values. $k_1^{avc}, \ldots k_N^{avc}$ may be identical, or at least some thereof may be different from the others. The number $k_n^{avc}$ of dimensions is, for example, 1792 or the like. The series length of $C_n^{avc'}$ is T which is the same as that of the mixed acoustic signal. That is, $C_n^{avc'}$ is expressed as a matrix of, for example, $T \times k_n^{avc}$ or $k_n^{avc} \times T$. The separated signal feature inference unit 125 infers the embedding vector $C_n^{avc'}$ according to, for example, the following formula (5).

[Math. 5]

$$C^{avc'} = AVCBlock(M'; \theta^{avc'})$$ (5)

Here, AVCBlock( ) is a function for obtaining the embedding vector $C^{avc'}_n{}'$ of the separated signal from the embedding vector M' of the input sound source signal and the provisional separated signal feature inference model parameter $\theta^{avc'}$ and outputting it. As this function, an arbitrary neural network can be used as long as the learning method can be applied thereto, and for example, a feedforward neural network or the like can be used.

<<Processing of Parameter Update Unit 127 (Step S1272)>>

The input teaching sound source signals S={S$_1$, . . . , S$_N$}, the separated signal Y'={Y$_1$', . . . , Y$_N$'} obtained in step S124, the embedding vector $C^{V'}$={$C^V_1{}'$, . . . , $C^V_N{}'$} of the sound source video signal obtained in step S122, and the embedding vector $C^{avc'}$={$C^{avc}_1{}'$, . . . , $C^{avc}_N{}'$} of the separated signal obtained in step S125 are input to the parameter update unit 127. The parameter update unit 127 updates the provisional model parameters $\Theta$={$\theta^a{}'$, $\theta^{v'}$, $\theta^{fr}$, $\theta^{sr}$, $\theta^{avc'}$} as follows on the basis of errors (differences) between the teaching sound source signals S and the separated signal Y' and error (inter-modal error) (difference) between the embedding vector $C^{V'}$ of the sound source video signal and the embedding vector $C^{avc'}$ of the separated signal.

[Math. 6]

$$\Theta = \underset{\Theta}{\operatorname{argmin}} \left\{ L_1(Y', S) + \lambda L_2(C^{V'}, C^{avc'}) \right\} \tag{6}$$

Here, formula (6) represents the provisional model parameters $\Theta$ for minimizing {$L_1(Y',S)+\lambda L_2(C^{V'},C^{avc'})$}. $\lambda$ is a hyper parameter for determining weights of separation learning based on errors between the teaching sound source signals S and the separated signal Y' and inter-modal correspondence learning based on an error between the embedding vector $C^{V'}$ of the sound source video signal and the embedding vector $C^{avc'}$ of the separated signal. For example, $\lambda$ is a real number of 0 or more. The first term $L_1(Y',S)$ on the right side of formula (6) corresponds to separation learning, and in this separation learning, errors between the teaching sound source signals S and the separated signal Y' are minimized. In other words, in this separation learning, differences between the features of the teaching sound source signals S and the features of the separated signal Y' separated in the sound domain are reduced. Definition of errors between the teaching sound source signals S and the separated signal Y' may be any one of an average square error, a mean squared error, or an average absolute error. For example, when the teaching sound source signals S and the separated signal Y' are time-frequency domain signals composed of amplitude spectrograms, and $L_1(Y',S)$ is an average square error between the teaching sound source signals S and the separated signal Y', $L_1(Y',S)$ is exemplified as follows.

[Math. 7]

$$L_1(Y', S) = \frac{1}{IJN} \sum_n \left\| |Y'_n| - |S_n| \right\|^2_F \tag{7}$$

Here, I and J represent a frequency bin and a total number of time frames of the amplitude spectrograms, |•| represents an absolute value, and //•//$_F$ represents a Frobenius norm. The second term $L_2(C^{V'}, C^{avc'})$ of the right side of formula (6) corresponds to inter-modal correspondence learning considering correspondence between a video of a sound source (speaker) and the separated signal Y', and this inter-modal correspondence learning minimizes an error between the embedding vector $C^{V'}$ of the sound source video signal and the embedding vector $C^{avc'}$ of the separated signal Y'. In other words, in this inter-modal correspondence learning, differences between features of a video domain of a video corresponding to the same sound source (speaker) (the embedding vector $C^{V'}$ of the sound source video signal) and features of the sound domain of the separated signal Y' (the embedding vector $C^{avc'}$ of the separated signal) is reduced. In other words, in this inter-modal correspondence learning, differences between features of video domains of videos corresponding to different sound sources (speakers) (the embedding vector $C^{V'}$ of the sound source video signal) and the features of the sound domain of the separated signal Y' (the embedding vector $C^{avc'}$ of the separated signal) is increased. The error between the embedding vector $C^{V'}$ of the sound source video signal and the embedding vector $C^{avc'}$ of the separated signal may be represented using similarity or may be represented using a distance. For example, $L_2(C^{V'},C^{avc'})$ can be represented using cosine similarity d(•) between column vectors of $C^V_n{}'$ and $C^{avc}_n{}'$ as follows.

[Math. 8]

$$L_2(C^{V'}, C^{avc'}) = \sum_n \sum_j \left[ \sum_{n' \neq n} \left| d\left(c^{v'}_{nj}, c^{avc'}_{n'j}\right) \right| - d\left(c^{v'}_{nj}, c^{avc'}_{nj}\right) \right] \tag{8}$$

[Math. 9]

$$d(a, b) = \frac{a^T b}{\|a\|^2 \|b\|^2} \tag{9}$$

Here, $C^V_{nj}{}'$ and $C^{avc}_{nj}{}'$ are j-th column vectors of $C^V_n{}'$ and $C^{avc}_n{}'$, $\bullet^T$ is a transposition of •, and //•// is L2 norm of the vector •. n'=1, . . . , N, the numbers of dimensions of $C^V_n{}'$ and $C^{avc}_n{}'$ are both k$_n$', the series lengths of $C^V_n{}'$ and $C^{avc}_n{}'$ are both T, both $C^V_n{}'$ and $C^{avc}_n{}'$ are a matrix of T×k$_n$' or k$_n$'×T, and j=1, . . . , T. The first term d ($C^V_{nj}{}'$, $C^{avc}_{n'j}{}'$) of the right side of formula (8) minimizes a cosine similarity d($C^V_{nj}{}'$, $C^{avc}_{n'j}{}'$) between an element $C^V_{nj}{}'$ of an embedding vector $C^{V'}$ of a sound source video signal corresponding to an n-th sound source video (speaker video) and an element $C^{avc}_{n'j}{}'$ of an embedding vector $C^{avc'}$ of a separated signal that does not correspond to the n-th sound source, and the second term of the right side maximizes a cosine similarity d($C^V_{nj}{}'$, $C^{avc}_{nj}{}'$) between the element $C^V_{nj}{}'$ of the embedding vector $C^{V'}$ of the sound source video signal corresponding to the n-th source video (speaker video) and an element $C^{avc}_{nj}{}'$ of an embedding vector $C^{avc'}$ of a separated signal corresponding to the n-th sound source. That is, learning is performed such that a similarity between the element $C^V_{nj}{}'$ representing a feature of a teaching sound source video signal S$_n$ corresponding to the n-th sound source (first sound source) among a plurality of sound sources and the element $C^{avc}_{n'j}{}'$ representing a feature of a separated signal Y$_n$' corresponding to an n'-th (n'≠n) sound source (second sound source different from the first sound source) decreases, and a similarity between the element $C^V_{nj}{}'$ if representing the feature of the teaching sound source video signal S$_n$ corresponding to the n-th sound source (first sound source) and the element $C^{avc}_{nj}{}'$ representing a feature of a separated signal Y$_n$ corresponding to the n-th sound source (first sound source) increases. The inference problem of the provisional model parameters $\Theta$={$\theta^a{}'$, $\theta^{v'}$, $\theta^{fr}$, $\theta^{sr}$, $\theta^{avc'}$} can be solved by any method. For example, the provisional model parameters $\Theta$ can be obtained by optimization using an error back propagation method. The updated provisional model parameters $\Theta=\{\theta^{a\prime}, \theta^{v\prime}, \theta^{f\prime}, \theta^{s\prime}, \theta^{av\prime}\}$ are stored in the storage unit 120.

<<End Condition Determination Processing (Step S126)>>

Next, the control unit 126 determines whether or not predetermined end conditions are satisfied. Although the end conditions are not limited, for example, it is possible to set that the number of times of updating the provisional model parameters $\Theta$ has reached a predetermined number of times, that the amount of updating the provisional model parameters $\Theta$ is within a predetermined range or less, and the like as the end conditions. If it is determined that the end conditions are not satisfied, the learning device 12 receives new teaching mixed acoustic signals $X'=\{x_1', \ldots, x_T'\}$, teaching sound source video signals $V'=\{V_1', \ldots, V_N'\}$, and teaching sound source signals $S=\{S_1, \ldots, S_N\}$ corresponding to each other as input, and re-executes processing of steps S121, S122, S123, S124, S125, and S1272. On the other hand, if is determined that the end conditions are satisfied, $\theta^{a\prime}, \theta^{v\prime}, \theta^{f\prime}$, and $\theta^{s\prime}$ among the updated provisional model parameters $\Theta=\{\theta^{a\prime}, \theta^{v\prime}, \theta^{f\prime}, \theta^{s\prime}, \theta^{av\prime}\}$ are output as the model parameters $\theta^a, \theta^v, \theta^f$, and $\theta^s$. The output model parameters $\theta^a, \theta^v, \theta^f$, and $\theta^s$ are stored in the storage unit 110 of the above-described sound source separation device 11 (FIG. 1) and used for the above-described sound source separation processing. Separated signals $Y=\{Y_1, \ldots, Y_N\}$ obtained by sound source separation processing based on the model parameters $\theta^a, \theta^v, \theta^f$, and $\theta^s$ obtained by the learning are associated with videos of respective sound sources (speakers) and reflect features of the sound sources (for example, utterance timings, phoneme information, speaker information such as sex and age, and the like). Therefore, in the present embodiment, multi-modal sound source separation with high separation accuracy can be realized.

[Hardware Configuration]

The sound source separation device 11 and the learning device 12 in each embodiment are devices configured by executing a predetermined program by a general-purpose or dedicated computer including a processor (a hardware processor) such as a central processing unit (CPU), memories such as a random-access memory (RAM) and a read-only memory (ROM). That is, each of the sound source separation device 11 and the learning device 12 includes a processing circuitry configured to implement each part included therein. This computer may include one processor and memory, or may include a plurality of processors or memories. This program may be installed in the computer or may be recorded in a ROM or the like in advance. In addition, some or all processing units may be configured using an electronic circuitry which realizes a processing function independently, instead of an electronic circuitry which realizes a functional configuration by reading a program like a CPU. Further, an electronic circuitry constituting a single device may include a plurality of CPUs.

Figure 3:
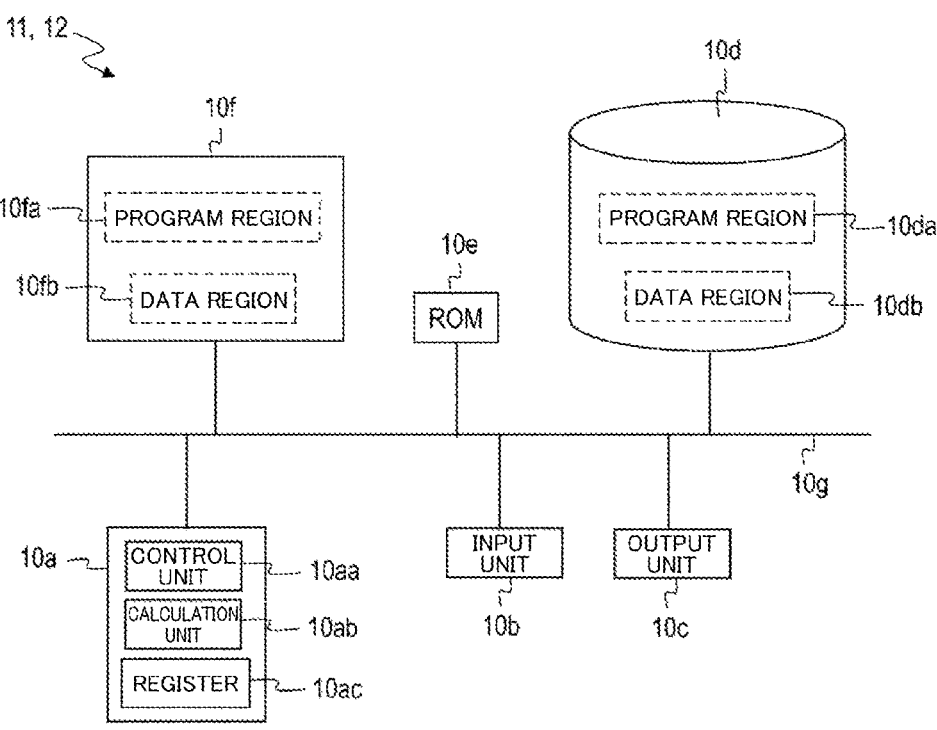
FIG. 3 is a block diagram illustrating a hardware configuration of the device.

FIG. 3 is a block diagram illustrating a hardware configuration of the sound source separation device 11 and the learning device 12 in each embodiment. As illustrated in FIG. 3, the sound source separation device 11 and the learning device 12 in this example include a central processing unit (CPU) 10a, an input unit 10b, an output unit 10c, a random access memory (RAM) 10d, a read only memory (ROM) 10e, an auxiliary storage device 10f, and a bus 10g. The CPU 10a in this example has a control unit 10aa, an arithmetic operation unit 10ab, and a register 10ac and executes various types of arithmetic operation processing according to various programs read in the register 10ac. In addition, the input unit 10b is an input terminal to which data is input, a keyboard, a mouse, a touch panel or the like. The output unit 10c is an output terminal through which data is output, a display, a LAN card controlled by the CPU 10a that has read a predetermined program, or the like. Further, the RAM 10d is a static random access memory (SRAM), a dynamic random access memory (DRAM), or the like, and has a program region 10da in which a predetermined program is stored and a data region 10db in which various types of data are stored. Further, the auxiliary storage device 10f is, for example, a hard disk, a magneto-optical (MO) disk, a semiconductor memory, or the like and has a program region 10fa in which a predetermined program is stored and a data region 10fb in which various types of data are stored. In addition, the bus 10g connects the CPU 10a, the input unit 10b, the output unit 10c, the RAM 10d, the ROM 10e and the auxiliary storage device 10f such that information can be exchanged. The CPU 10a writes a program stored in the program region 10fa of the auxiliary storage device 10f to the program region 10da of the RAM 10d according to a read operating system (OS) program. Likewise, the CPU 10a writes various types of data stored in the data region 10fb of the auxiliary storage device 10f to the data region 10db of the RAM 10d. The address on the RAM 10d in which this program or data is written is stored in the register 10ac of the CPU 10a. The control unit 10aa of the CPU 10a sequentially reads out these addresses stored in the register 10ac, reads a program or data from the region on the RAM 10d indicated by the read address, and causes the calculation unit 10ab to sequentially execute the operations indicated by the program, and stores the calculation result in the register 10ac. According to such a configuration, the functional configurations of the sound source separation device 11 and the learning device 12 are realized.

The above program can be recorded on a computer-readable recording medium. An example of computer-readable recording medium is non-transitory (non-transitory) recording medium. Examples of such a recording medium include a magnetic recording device, an optical disc, a magneto-optical recording medium, and a semiconductor memory.

The distribution of the program is performed by, for example, selling, transferring and lending or the like a portable recording medium such as a DVD or CD-ROM in which the program is recorded. Further, the program may be stored in a storage device of a server computer and transferred from the server computer to another computer via a network to distribute the program. As described above, a computer executing such a program stores, for example, a program recorded on a portable recording medium or a program transferred from a server computer, in a storage device thereof first. Then, at the time of executing processing, the computer reads the program stored in the storage device thereof and executes processing according to the read program. As another execution form of the program, the computer may directly read the program from the portable recording medium and execute processing according to the program, or each time a program is transferred from the server computer to the computer, processing according to the received program may be sequentially executed. In addition, a program is not transferred from the server computer to the computer, and the above-described processing may be executed by a so-called application service provider (ASP) type service which realizes a processing function only by an execution instruction and result acquisition. It is assumed that the program in this embodiment includes information that is used for processing by a computer and is equivalent to the program (data that is not a direct command for a computer but has the nature of defining processing of the computer).

Although the device is configured by executing a predetermined program on a computer in each embodiment, at least a part of these processing contents may be realized using hardware.

The present invention is not limited to the above-described embodiment. For example, the sound source separation device 11 and the learning device 12 may be separately configured and connected via a network such as the Internet, and model parameters may be provided from the learning device 12 to the sound source separation device 11 via the network, or the model parameters may be provided from the learning device 12 to the sound source separation device 11 via a portable recording medium such as a USB memory without via the network. Alternatively, the sound source separation device 11 and the learning device 12 may be integrally configured, and the model parameter obtained by the learning device 12 may be provided to the sound source separation device 11.

In addition, in the present embodiment, a neural network is input is used as a model. However, the present invention is not limited to thereto, and a probability model such as a hidden Markov model may be used as a model, or other models may be used.

Further, in the present embodiment, a case in which a sound source is a speaker and sound is speech is exemplified. However, the present invention is not limited thereto, and sound sources may include animals, plants, natural objects, natural phenomena, machines and the like in addition to people, and sound may include cry, friction sound, vibration sound, rain sound, lightning sound, engine sound, and the like.

In addition, the above-described various kinds of processing may be performed not only in time series in accordance with the description but also in parallel or individually based on the processing capability of an apparatus performing the processing or as needed. In addition, as a matter of course, it is possible to variously modify the present invention as appropriate without departing from the spirit of the present invention.

REFERENCE SIGNS LIST

11 Sound source separation device
12 Learning device
111, 121 Sound stream processing unit
112, 122 Video stream processing unit
113, 123 Fusion unit
114, 124 Separated signal inference unit
125 Separated signal feature inference unit
The invention claimed is:

1. A method for separating a sound source, comprising:
estimating a separated signal including a signal representing a target sound emitted from a sound source among a plurality of sound sources by applying a mixed acoustic signal and sound source video signals to a model, wherein the mixed acoustic signal represents a mixed sound of sound emitted from the plurality of sound sources, the sound source video signals represent videos of at least some of the plurality of sound sources to the model,
the model is obtained by learning using a neural network, wherein the model is learned based on differences between features of the separated signal and features of teaching data of sound source video signals, the features of the separated signal are obtained by applying teaching mixed acoustic signals as teaching data of the mixed acoustic signal and teaching sound source video signals as teaching data of the sound source video signals to the model, wherein
the learning is further based on:
a similarity between a first element representing the features of the teaching sound source video signals corresponding to a first sound source among the plurality of sound sources and a second element representing the features of the separated signal corresponding to a second sound source different from the first sound source decreases, and
a similarity between the first element representing the features of the teaching sound source video signals corresponding to the first sound source and a third element representing the features of the separated signal corresponding to the first sound source increases.

2. The according to claim 1, wherein
the model is further obtained by learning based on differences between the separated signal obtained by applying the teaching mixed acoustic signals and the teaching sound source video signals to the model and teaching sound source signals which are teaching data of the separated signal corresponding to the teaching mixed acoustic signals and the teaching sound source video signals.

3. The method according to claim 1, wherein
the sound source video signals represent a video of each of the plurality of sound sources.

4. The method according to claim 1, wherein
the plurality of sound sources includes a plurality of different speakers, the mixed acoustic signal includes a speech signal, and the sound source video signals represent videos of the speakers.

5. The method according to claim 1, wherein
the separated signal includes a signal representing a target sound emitted from a certain sound source among the plurality of sound sources and a signal representing a sound emitted from another sound source.

6. The method according to claim 1, wherein
the model is further obtained by learning based on differences between the separated signal obtained by applying the teaching mixed acoustic signals and the teaching sound source video signals to the model and teaching sound source signals which are teaching data of the separated signal corresponding to the teaching mixed acoustic signals and the teaching sound source video signals.

7. The method according to claim 1, wherein
the sound source video signals represent a video of each of the plurality of sound sources.

8. The method according to claim 1, wherein
the plurality of sound sources includes a plurality of different speakers, the mixed acoustic signal includes a speech signal, and the sound source video signals represent videos of the speakers.

* * * * *